(12) United States Patent
Wentworth et al.

(10) Patent No.: US 6,585,195 B2
(45) Date of Patent: Jul. 1, 2003

(54) CABLE MANAGEMENT SYSTEM INCLUDING VARIABLE SEGMENTS

(75) Inventors: Mike Wentworth, Belle Plaine, MN (US); Thomas W. Kampf, Minnetonka, MN (US); Alex Watts, Minnetonka, MN (US); Pat Nault, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/842,518

(22) Filed: Apr. 25, 2001

(65) Prior Publication Data

US 2002/0158170 A1 Oct. 31, 2002

(51) Int. Cl.$^7$ ................................................. F16L 3/02
(52) U.S. Cl. ........................................ 248/49; 248/68.1
(58) Field of Search ............................. 248/49, 224.51, 248/223.41, 68.1; 174/48; 285/184; 454/64; 52/11, 15, 16

(56) References Cited

U.S. PATENT DOCUMENTS

| | | | | |
|---|---|---|---|---|
| 689,894 A | * | 12/1901 | Lutz | ........................... 138/157 |
| 917,328 A | | 4/1909 | Lutz | |
| 2,805,401 A | * | 9/1957 | Crowley | ..................... 285/184 |
| 2,975,805 A | * | 3/1961 | Horn | ......................... 137/615 |
| 3,436,047 A | | 4/1969 | Foltz | |
| 3,592,239 A | * | 7/1971 | Aldler | ........................ 138/105 |
| 4,130,463 A | * | 12/1978 | Klavir | ........................ 105/254 |
| 4,480,859 A | * | 11/1984 | Rueckl et al. | ........... 285/145.1 |
| 4,627,469 A | | 12/1986 | Buard | |
| 4,652,017 A | * | 3/1987 | Dreshsel | ..................... 285/184 |
| 4,781,401 A | * | 11/1988 | Sharp | .......................... 285/42 |
| 5,067,678 A | | 11/1991 | Henneberger et al. | |
| 5,143,123 A | | 9/1992 | Richards et al. | |
| 5,160,811 A | | 11/1992 | Ritzmann | |
| 5,161,580 A | | 11/1992 | Klug | |
| 5,215,338 A | * | 6/1993 | Kimura et al. | .............. 138/120 |
| 5,240,209 A | | 8/1993 | Kutsch | |
| 5,271,585 A | | 12/1993 | Zetena, Jr. | |
| 5,316,243 A | | 5/1994 | Henneberger | |
| 5,316,244 A | | 5/1994 | Zetena, Jr. | |
| 5,335,349 A | | 8/1994 | Kutsch et al. | |
| 5,375,891 A | * | 12/1994 | Sicotte et al. | ............... 137/615 |
| 5,409,266 A | * | 4/1995 | Baker | ......................... 285/184 |
| 5,503,354 A | | 4/1996 | Lohf et al. | |
| 5,752,781 A | | 5/1998 | Haataja et al. | |
| 5,803,653 A | | 9/1998 | Zufetti | |
| 5,923,753 A | | 7/1999 | Haataja et al. | |
| 5,924,260 A | | 7/1999 | Austin et al. | |
| 5,937,131 A | | 8/1999 | Haataja et al. | |
| 5,995,699 A | | 11/1999 | Vargas et al. | |
| 6,037,538 A | | 3/2000 | Brooks | |
| 6,076,779 A | | 6/2000 | Johnson | |
| 6,174,231 B1 | * | 1/2001 | Bodin | ......................... 454/184 |
| 6,206,456 B1 | | 3/2001 | Steury et al. | |

FOREIGN PATENT DOCUMENTS

| | | |
|---|---|---|
| EP | 0 578 459 A1 | 1/1994 |
| EP | 1 011 180 A1 | 6/2000 |
| EP | 1 030 426 A2 | 8/2000 |
| GB | 293952 | 7/1928 |
| GB | 2 250 564 A | 6/1992 |
| WO | WO 02/31938 A2 | 4/2002 |

OTHER PUBLICATIONS

ADC Telecommunications brochure entitled "FiberGuide® Fiber Management Systems," 53 pages, dated 09/00.

* cited by examiner

Primary Examiner—Leslie A. Braun
Assistant Examiner—Ingrid Weinhold

(57) ABSTRACT

A curved telescoping trough assembly and method of assembly. The assembly includes first and second trough members. Each trough member includes two upstanding sidewalls extending from a base defining a generally U-shaped trough having an open top and a trough interior for receiving at least one telecommunications cable defining a cable pathway. The sidewalls or the base of the trough members may be curved to create a curved cable pathway. The first trough member having an end which slidably receives an end of the second trough member and a portion of the second trough member so that the trough members create a combined angled cable pathway. The size of the portion of the second trough member received by the first trough member is variable so that the trough assembly may be selectively set at a third angle from a range of angles.

21 Claims, 8 Drawing Sheets

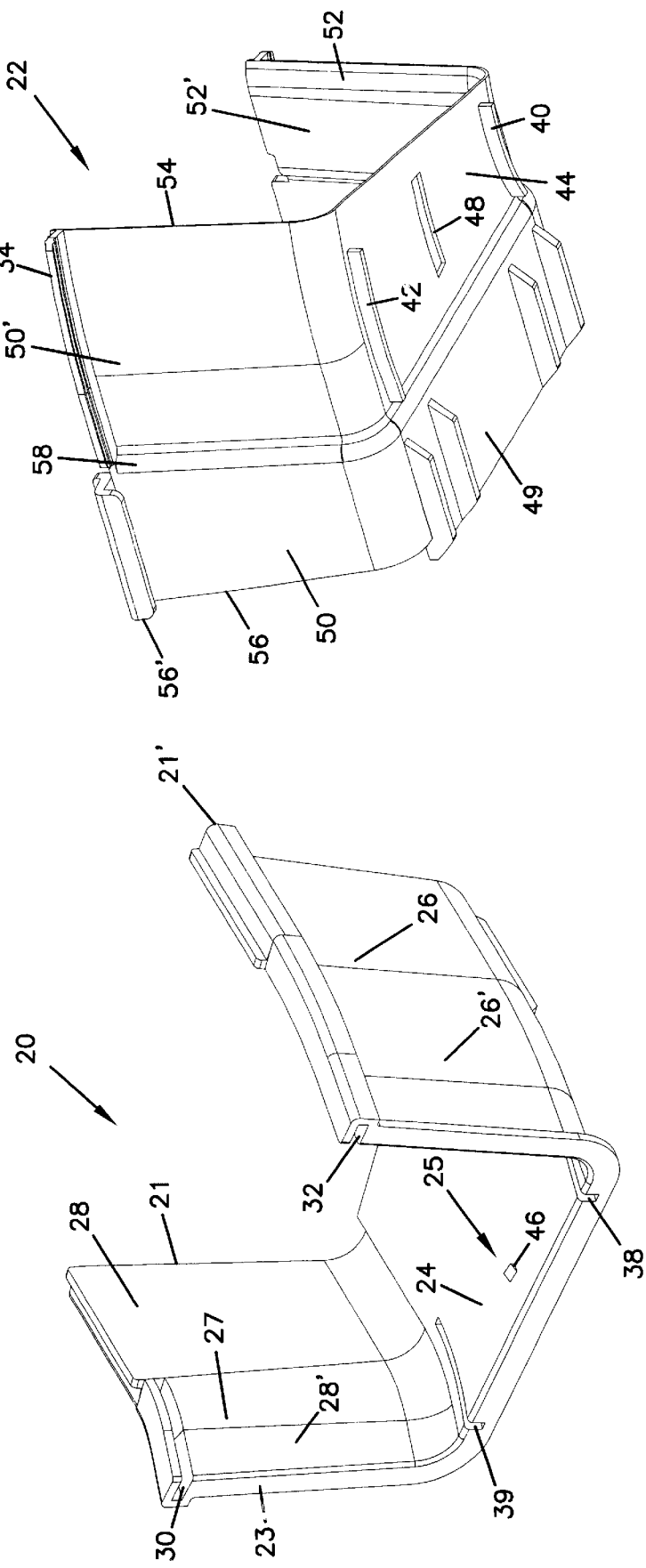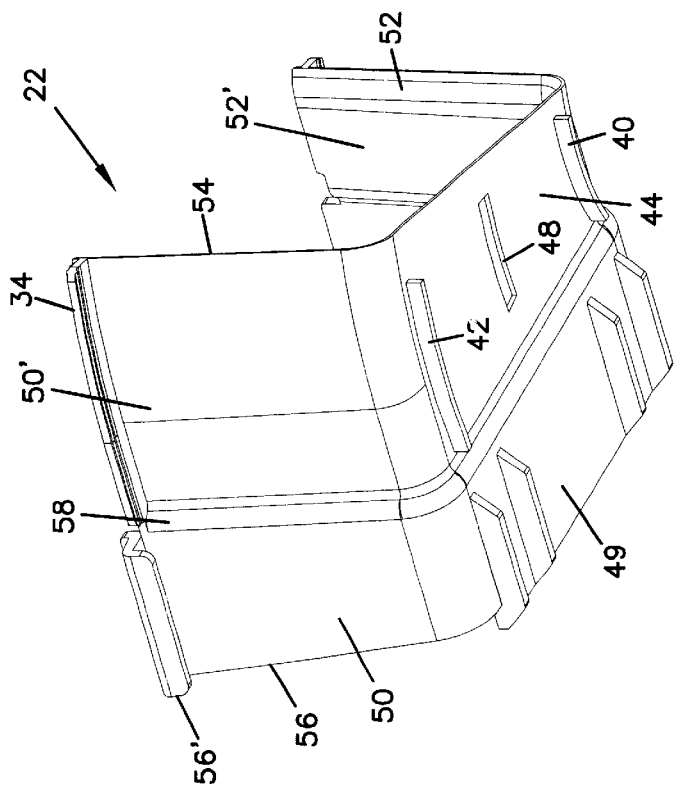

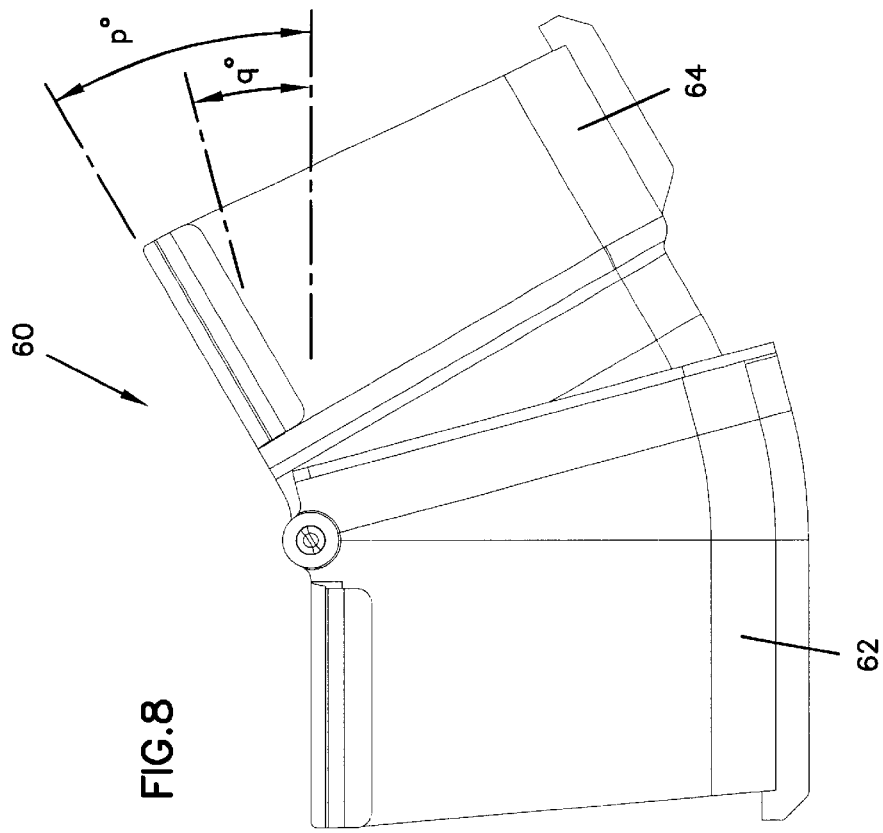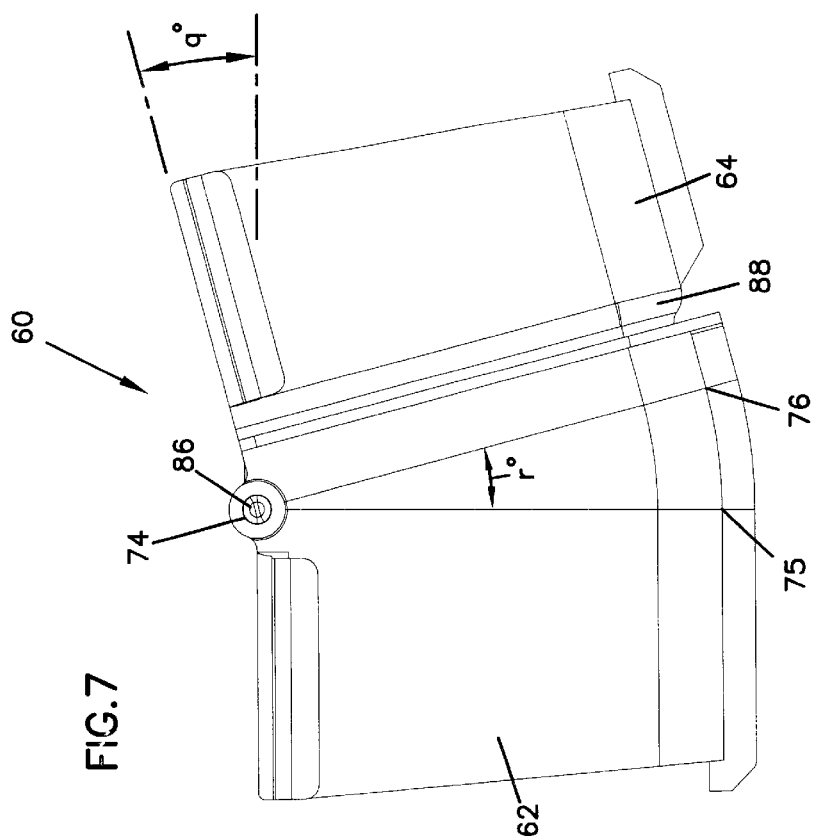

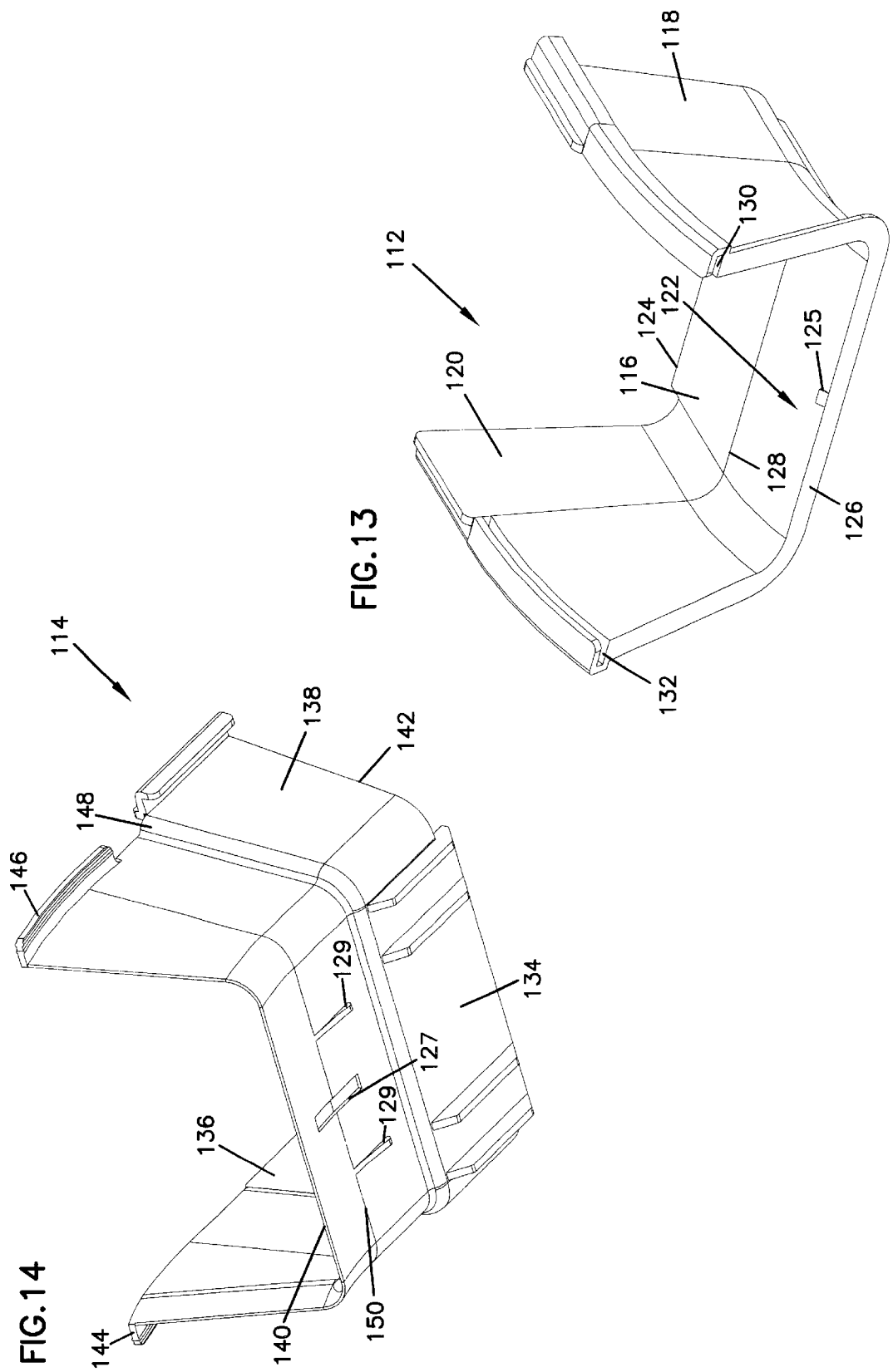

CABLE MANAGEMENT SYSTEM INCLUDING VARIABLE SEGMENTS

FIELD OF THE INVENTION

This invention pertains to a system for the management and routing of cables, such as telecommunications cables. More particularly, this invention pertains to angled trough assemblies for cable management systems.

BACKGROUND OF THE INVENTION

In the telecommunications industry, the use of optical fibers for signal transmission is accelerating. With the increased utilization of optical fiber systems, optical fiber cable management requires industry attention. Similar issues exist with other telecommunications cables such as copper-based cables.

One area of telecommunications cable management that is necessary is the routing of cables from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Accordingly, such routing systems often include a plurality of trough members, fittings and couplings for routing the cables. U.S. Pat. Nos. 5,067,678; 5,316,243; and 5,752,781 show various cable routing systems.

When routing optical fibers, it is desirable that the routing system will be easy to install. For example, providing a continuous cable path throughout the system can be a challenge, such as when obstacles or misalignments arise during installation of the system. There is a need for devices which make system installation easier and less reliant on precisely aligned components.

U.S. Pat. No. 6,076,779 to Johnson discloses an apparatus for linking misaligned cable troughs. The Johnson device uses a number of different materials other than the preferred plastic. There is a need for an improved, simplified, cost effective system for making small adjustments in the alignment of a cable management trough.

SUMMARY OF THE INVENTION

One aspect of the present invention relates to a curved telescoping trough assembly including first and second trough members. Each trough member includes two upstanding sidewalls extending from a base defining a generally U-shaped trough having an open top and a trough interior for receiving at least one telecommunications cable defining a cable pathway. The sidewalls or the base of the trough members may be curved to create a curved cable pathway. The first trough member has an end which slidably receives an end of the second trough member and a portion of the second trough member so that the trough members create a combined angled cable pathway. The size of the portion of the second trough member received by the first trough member is variable so that the trough assembly may be selectively set at an angle from a range of angles.

An additional aspect of the invention relates to incorporating guide channels and guide rails on the trough members to assist in guiding the trough members relative to each other.

Another aspect of the present invention relates to incorporating hinge posts and hinge apertures in the sidewalls of the trough members so that the trough members may pivot relative to each other.

A further aspect of the present invention relates to incorporating a retention tab and slot in the trough members to confine movement of one trough member relative to the other.

A still further aspect of the present invention relates to the first and second trough members having opposite ends defining the same coupling profile for coupling to similar coupling members on opposite ends of the trough assembly.

An additional aspect of the present invention relates to a method for assembling a cable management system comprising the steps of providing a first and second spaced-apart U-shaped end members, providing an extendable, curved U-shaped trough assembly having first and second trough members positioned between the first and second end members, and connecting the first and second trough members to the respective first and second end members, wherein the first and second trough members remain freely slidable upon disconnecting at least one of the first and second trough members from the respective first and second end members.

BRIEF DESCRIPTION OF THE DRAWINGS

FIG. 5 is a perspective view of the first trough member of the assembly shown in FIG. 3.

FIG. 6 is a perspective view of the second trough member of the assembly shown in FIG. 3.

FIG. 7 is a side view of a hinged angle-up cable management trough assembly in a retracted arrangement according to the present invention.

FIG. 8 side view of the trough assembly of FIG. 7 in an extended arrangement.

FIG. 13 is a perspective view of the first trough member of the assembly shown in FIG. 11.

FIG. 14 a perspective view of the second trough member of the assembly of FIG. 11.

DETAILED DESCRIPTION OF THE PREFERRED EMBODIMENTS

The present invention concerns a cable management system that includes variably-angled trough assemblies. The cable management system may include additional horizontal troughs, vertical troughs, junctions and couplings. The trough assemblies of the present invention allow for use in cable management systems where two ends of cable management troughs are not linearly aligned. Examples of situations where the ends are not linearly aligned include corrections of misalignments, and transitioning through offsets or directional changes. Also, the trough assemblies of the present invention may be used for avoidance of obstacles where the ends are linearly aligned, but the adjoining path must be circuitous.

Figure 1:
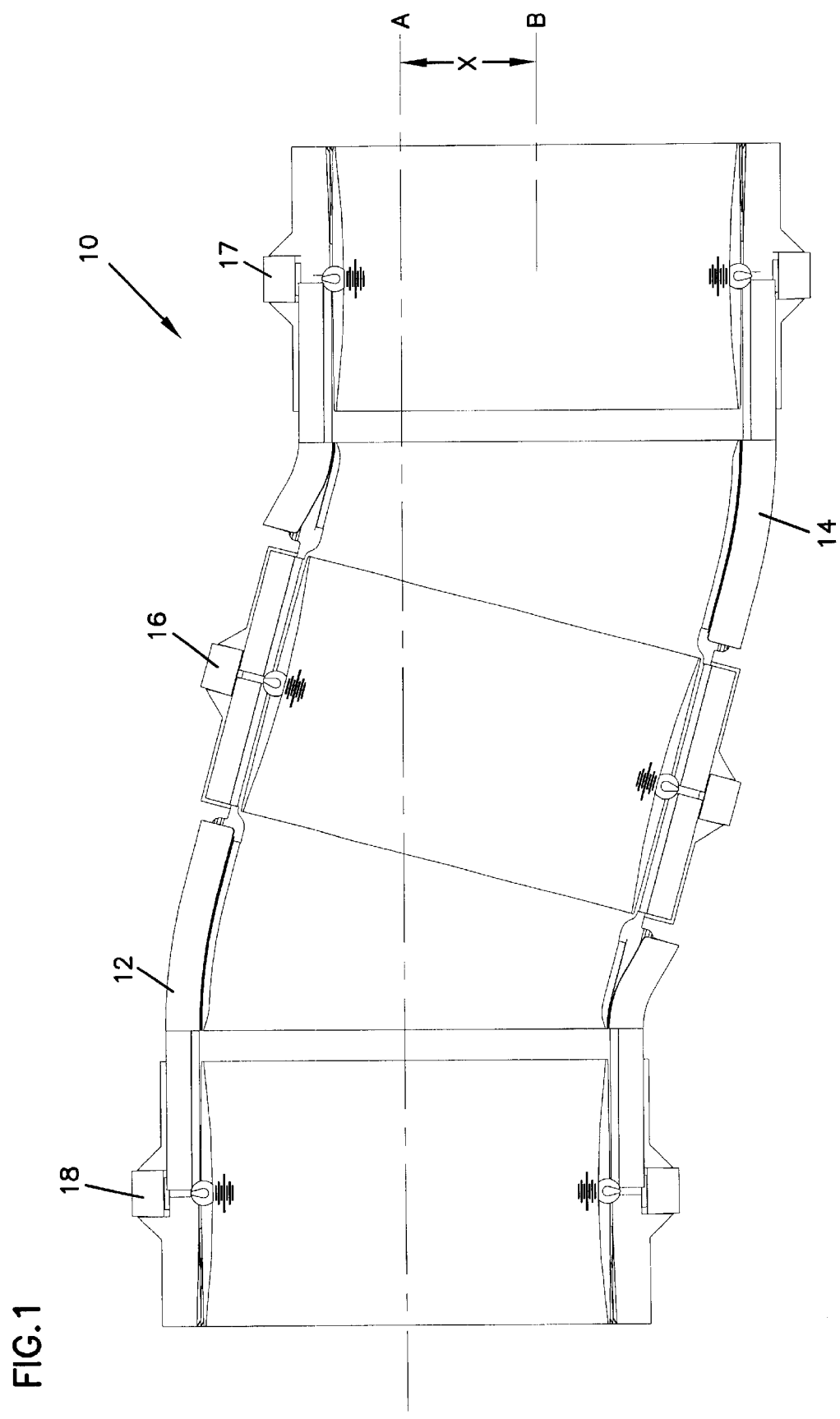
FIG. 1 top view of a cable management system employing two angled trough sections according to the present invention showing an offset created by the trough system.
Figure 2:
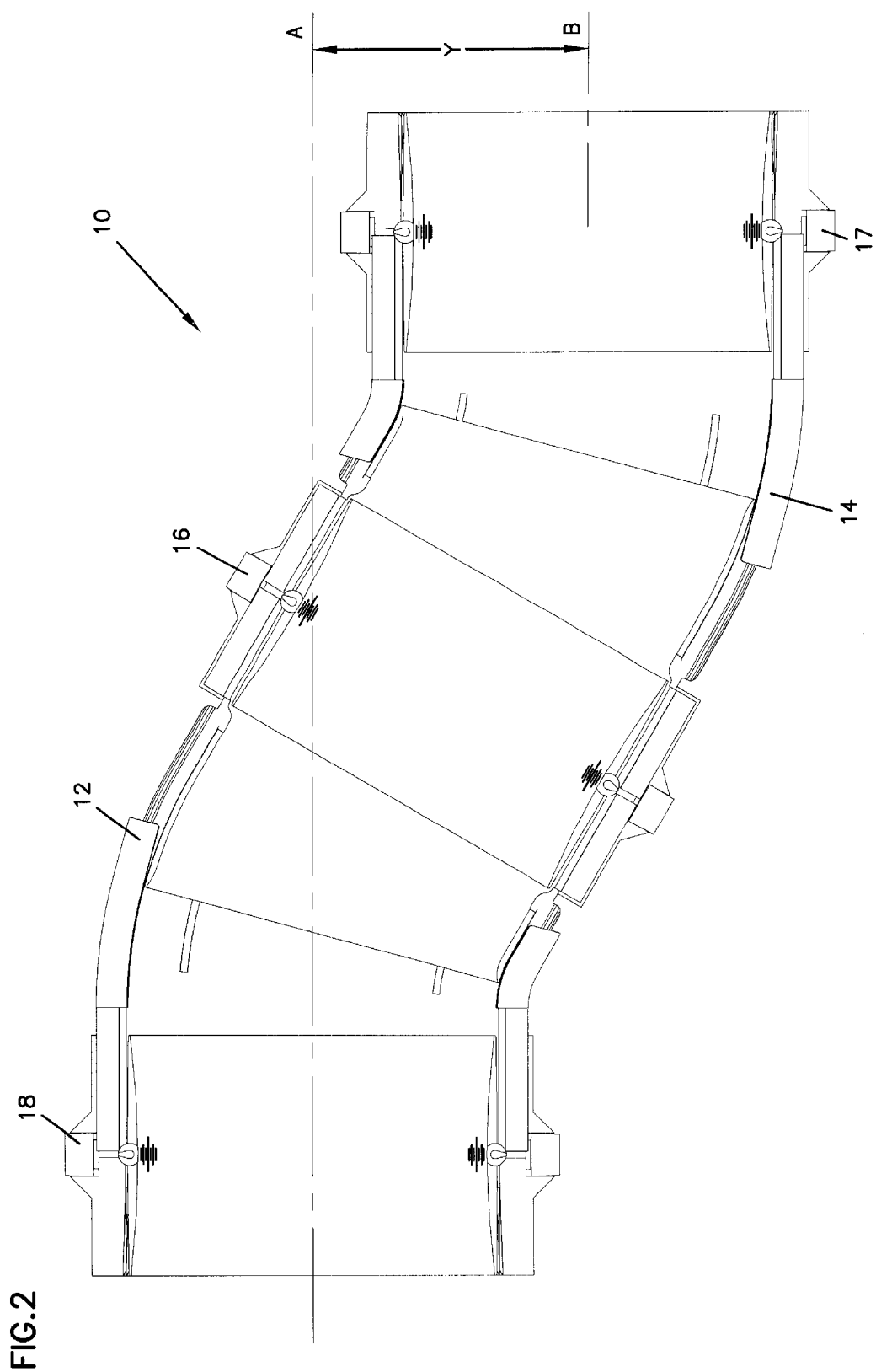
FIG. 2 is a top view of the cable management system of FIG. 1, but with the angled trough sen extended position to create a larger offset.

The trough assemblies of the present invention are telescoping angled trough assemblies and may take a number of shapes to link trough sections or other system components. FIGS. 1 and 2 show a cable management system 10 employing two angled trough assemblies 12 and 14 defining a generally U-shaped trough having an open top and a trough interior for receiving at least one telecommunications cable. The angled trough assemblies 12 and 14 are coupled to each other by junction piece 16 and may be coupled to other trough sections by junction pieces 17 and 18. Example junction pieces 16, 17, and 18 are shown in greater detail in U.S. Pat. No. 5,752,781, the disclosure of which is incorporated by reference.

The angled trough assemblies 12 and 14 can be slidably adjusted between fully extended and fully retracted positions to create larger or smaller angles. FIG. 1 shows trough assemblies 12 and 14 in a fully retracted position producing angles of 15 degrees. FIG. 2 shows the same system 10, but the angled assemblies 12 and 14 are shown in fully extended positions creating angles of 30 degrees.

It is important to angle the troughs without creating sharp angles or edges. The cable managed by the trough can be damaged or the signals carried by the cables may be attenuated or lost if the cables are bent at angles with a bend radius smaller than the minimum band radius for the cable. Therefore, the angled troughs should be constructed to maintain a minimum bend radius for the cables.

Broken lines A and B mark the center points of the trough assemblies 12 and 14 leading away from the system 10. The separation between lines A and B defines an offset created by the system 10. By extending the angled trough assemblies 12 and 14 thereby creating larger angles, a greater offset may be produced. This can be observed by comparing offset x in FIG. 1 to offset y in FIG. 2.

Each trough assembly includes two trough members. The trough members have a mating end and a coupling end. The mating ends are configured so that the mating end of one trough member may be slidably received by the mating end of a second trough member. The coupling ends preferably define identical coupling profiles for coupling the trough assembly to two similar trough sections.

Figure 4:
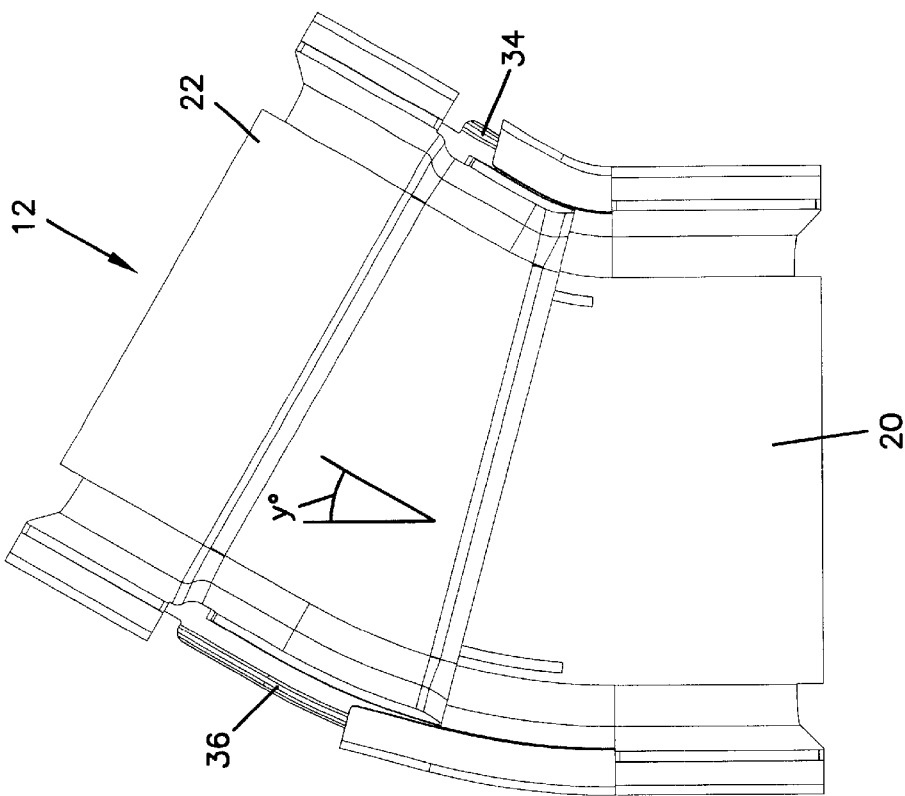
FIG. 4 is a top view of the trough assembly of FIG. 3 in an extended arrangement.
Figure 3:
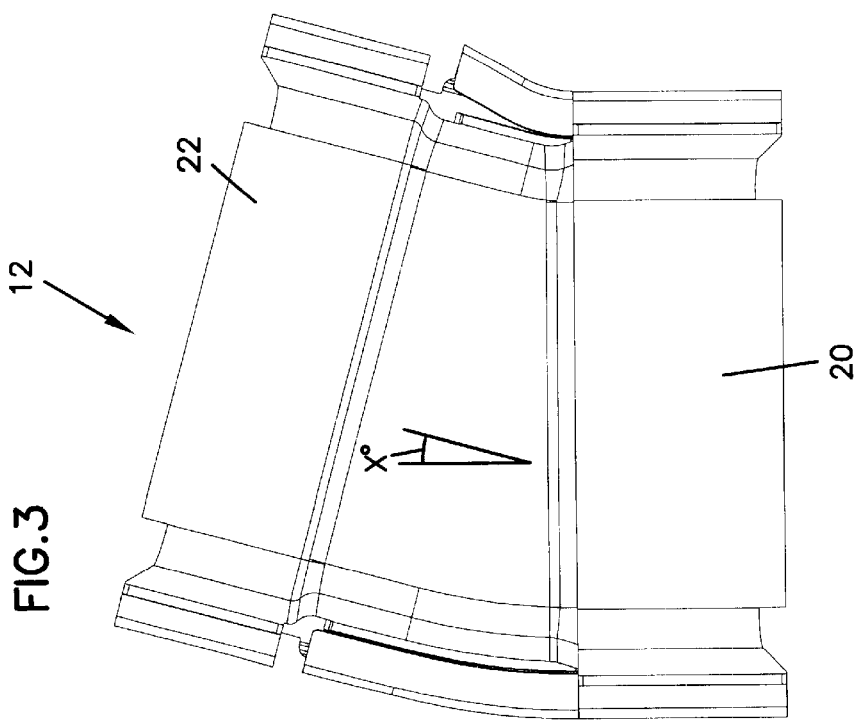
FIG. 3 a top view of an angle-left/right cable management trough assembly in a retracted arrangement according to the present invention.

FIGS. 3 and 4 show trough assembly 12, a left/right trough assembly, in its retracted and extended positions. Trough assembly 12 includes two trough members 20 and 22. As shown in FIG. 5, first trough member 20 includes a base 24 from which extends two upstanding sidewalls 26 and 28. Trough member 20 has first and second ends 21 and 23. The sidewalls 26 and 28 along with the base 24 define a longitudinal cable pathway 25 from coupling end 21 to mating end 23 of the trough member 20. A portion 26' and 28' of sidewalls 26 and 28 are curved in a horizontal direction so that the cable pathway 25 is also curved horizontally. In the embodiment shown in the Figures, cable pathway 25 of trough element 20 curves so that the cable pathway exits the trough member angled 15 degrees from its original direction. It is to be understood that trough element 20 may define a cable pathway of various other angles, for example 10 degrees or 30 degrees.

In each trough member according to the present invention, the curved sidewalls or the curved base should curve at a radius of curvature equal to or greater than the minimum bend radius of the cable to be managed by the trough. In the illustrated embodiment, the sidewalls maintain a 2" bend radius in the horizontal plane.

The curved portions 26' and 28' of sidewalls 26 and 28 define curved guide channels 32 and 30 for receiving guide rails 34 and 36 of the second trough member 22 (shown in FIG. 6). The guide channels 30 and 32 extend from the second end 23 of the sidewalls 26 and 28 along an upper edge of the trough member 20. The guide channels 30 and 32 are defined along an inside surface 27 of sidewalls 26 and 28, and are shaped to receive a horizontal guide rail.

First trough member 20 also defines curved guide channels 38 and 39 in a top surface of the base 24. Guide channels 38 and 39 are located toward side edges of the base 24 near the upstanding sidewalls 26 and 28. Guide channels 38 and 39 are configured to receive vertical guide rails 40 and 42 which extend from a bottom surface 44 of second trough member 22.

First trough member 20 may also include a retention tab 46 having a ramped surface. The retention tab 46 is received in a retention groove 48 defined by base 49 of the second trough member 22 (shown in FIG. 6). The retention tab 46 assists in guiding the two trough members together, prevents the second trough member 22 from being removed from the first trough member 20 after assembly, and limits the combined angle of assembly 12 to 30°.

As shown in FIG. 6, second trough member 22 includes upstanding sidewalls 50 and 52 extending from base 49. The second trough member has a coupling end 56 and a mating end 54. Like the first trough member 20, the base 49 and sidewalls 50 and 52 of the second trough member 22 define a longitudinal cable pathway from end 54 to end 56 of the trough member 22, and a portion 50' and 52' of sidewalls 50 and 52 are curved so that the cable pathway is also curved. The embodiment of the second trough member 22 shown in FIG. 4 defines a cable pathway that is angled 15°.

Trough member 22 is tapered at point 58 so that end 54 of trough member 22 may be slidably received in the second end 23 of first trough member 20. Second trough member 22 includes curved guide rails 34, 36, 40 and 42 which are configured to be slidably received by second end 23 of first trough member 20 into guide channels 32, 30, 39 and 38 respectively. In this manner, a variable portion of trough member 22 may be slidably received by trough member 20.

When first trough member 20 receives the second trough member 22, the cable pathway 25 of the first trough member communicates with the cable pathway of the second trough member 22 creating a combined cable pathway characterized by a combined angle (shown as angles x° and y° in FIGS. 3 and 4). By pushing the second trough member 22 further into the first trough member 20, the resulting combined angle x° of the trough assembly 12 is reduced (shown in FIG. 3 as 15°). By pulling the second trough member 22 away from the first trough member 20, assembly 12 is characterized by a larger combined angle y° (shown in FIG. 4 as 300). In this manner the trough assembly 12 may be telescoped to define a cable pathway characterized by any angle falling within a range of angles. The minimum angle is the angle of the second trough member. The maximum angle is the sum of the angles of the first and second trough members. In the embodiment shown in the FIGS., since both trough members 20 and 22 are each angled at 15°, the combined angle of the trough assembly 12 may be varied between 15° and 30°.

End 21 of trough member 20 and end 56 of trough member 22 form opposed coupling ends of trough assembly 12. The opposed ends 21 and 56 of trough assembly 12 include outwardly extending flanges 21' and 56'. As shown in the illustrated embodiments, flanges 21' and 56' may be L-shaped, i.e. angled at ninety degrees. The opposed ends 21 and 56 define the same coupling profile, so that the assembly 12 may be coupled at both ends using similar couplings such as couplings 16, 17, and 18 shown in FIGS. 1 and 2.

The adjustable trough assembly 12 has advantages over prior systems. Where space is limited, the sliding trough assembly 12 may correct small offsets without resorting to 90° or 45° elbows which typically require more space. Furthermore, the preferred adjustable trough assembly includes only a few main parts, two in the illustrated embodiment, making installation more efficient. At the same time the assembly 12 is sufficiently versatile to serve in a variety of applications.

Figure 9:
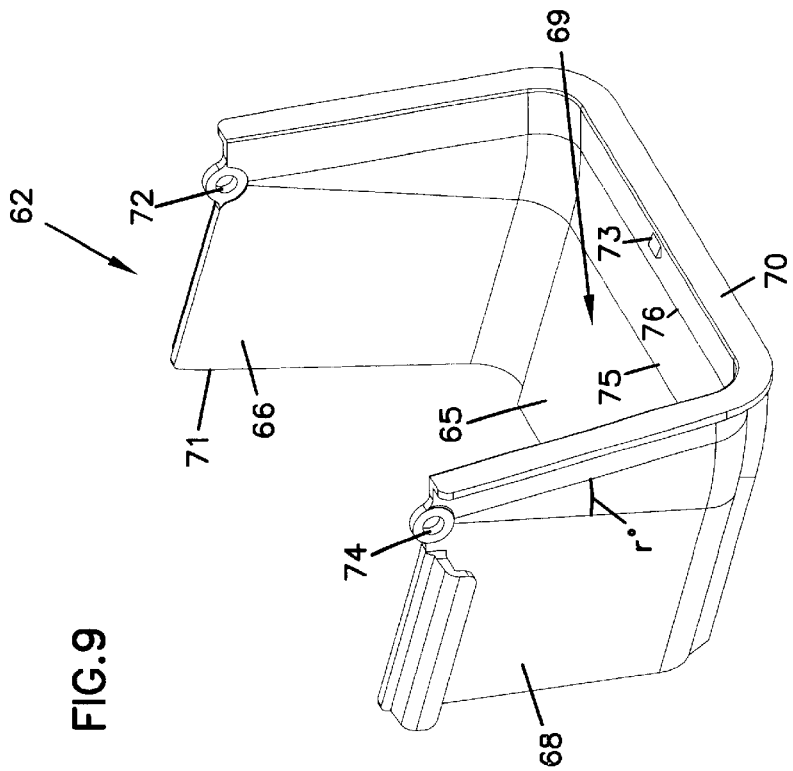
FIG. 9 is a perspective view of the first trough member of the assembly shown in FIG. 7.

FIGS. 7 and 8 show an angled-up trough assembly 60 according to the present invention. Trough assembly 60 curves and transitions the cable management system upwards. In the embodiment shown in the Figures, trough assembly 60 may be adjusted to angle a cable pathway upwards at any angle between 15 and 30 degrees. Trough assembly 60 includes two trough members 62 and 64. Trough member 62 shown in FIG. 9 includes a base 65 and sidewalls 66 and 68 forming a U-shaped trough for receiving a plurality of telecommunications cables. The U-shaped trough defines a cable pathway 69 from end 70 to end 71 of trough member 62.

Sidewalls 66 and 68 of trough member 62 define hinge apertures 72 and 74. Base 65 of trough member 62 is curved upward from point 75 to point 76 at a radius of curvature measured from the hinge apertures 72. The curved portion of base 65 angles the cable pathway 15° upwards as indicated by angle r° in FIGS. 7 and 9. Angle r° may be other angles and still fall within the present invention.

Figure 10:
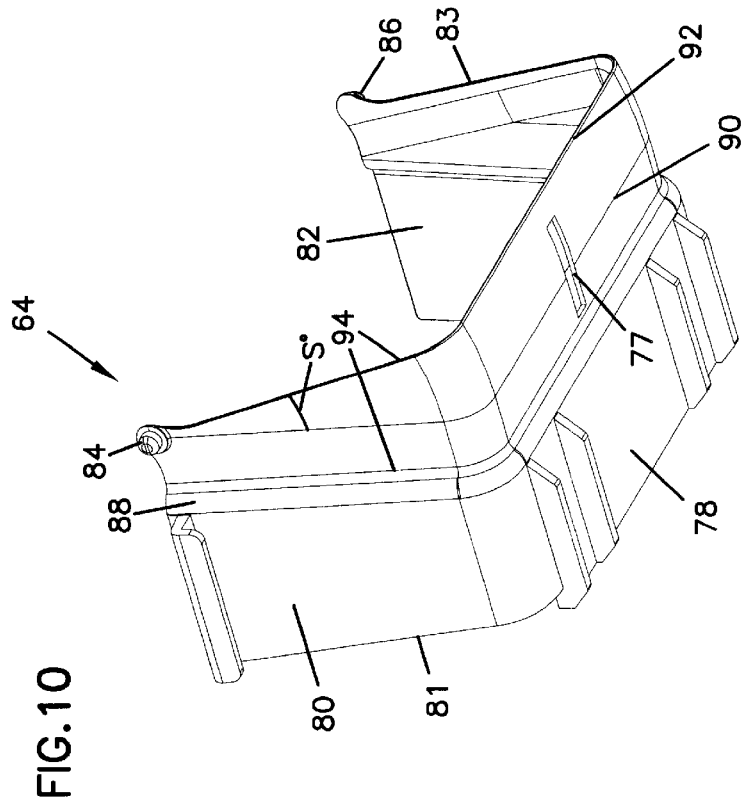
FIG. 10 is perspective view of the second trough member of the assembly shown in FIG. 7.

Trough member 64 shown in FIG. 10 also includes a base 78 and two sidewalls 80 and 82 forming a U-shaped trough for receiving a plurality of telecommunications cables. The U-shaped trough defines a cable pathway from end 81 20 to end 83 of trough member 64. Sidewalls 80 and 82 each define a hinge post 84 and 86. Hinge posts 84 and 86 are configured to fit into hinge apertures 72 and 74 of trough member 62.

Trough member 64 is tapered at point 88 so that end 83 of trough member 64 may be slidably received in end 70 of trough member 62. Base 78 of trough member 64 is curved from point 90 to point 92. The radius of curvature for base 78 is measured from the hinge posts 84 and 86. In the embodiment shown in the Figures, base 78 is angled 15° upwards as indicated by angle s° in FIG. 10.

End 83 of trough member 64 is received by trough member 62 so that hinge posts 86 and 84 are rotatably received in hinge apertures 74 and 72. In this configuration cable pathway 69 communicates with the cable pathway defined by trough member 64. Trough member 64 may be rotated relative to trough member 62 about the hinge posts 84 and 86. The combined cable pathway is characterized by a combined angle. When trough assembly 60 is in a fully retracted position with all of tapered portion 94 of end 83 of trough member 64 received by trough member 62 as shown in FIG. 7, the trough assembly angles the cable pathway upwards at a combined angle q° which is equal to angle s° in FIG. 10. When trough assembly 60 is in a fully extended position as shown in FIG. 8, the trough assembly 60 angles the cable pathway upwards at a combined angle p° which is equal to angle s° and angle r°. The maximum angle for trough assembly 60 is defined by the sum of angles s° and r°.

Trough member 10 may also include a retention tab 73 having a ramped surface. The retention tab 73 is received in a retention groove 77 defined by base 78 of trough member 64 (shown in FIG. 10). The retention tab 73 assists in guiding the two trough members relative to one another, assists in preventing base 78 of trough member 64 from being removed from a position adjacent base 65 of trough member 62, and limits the combined angle of assembly 60 to 30°.

Figure 11:
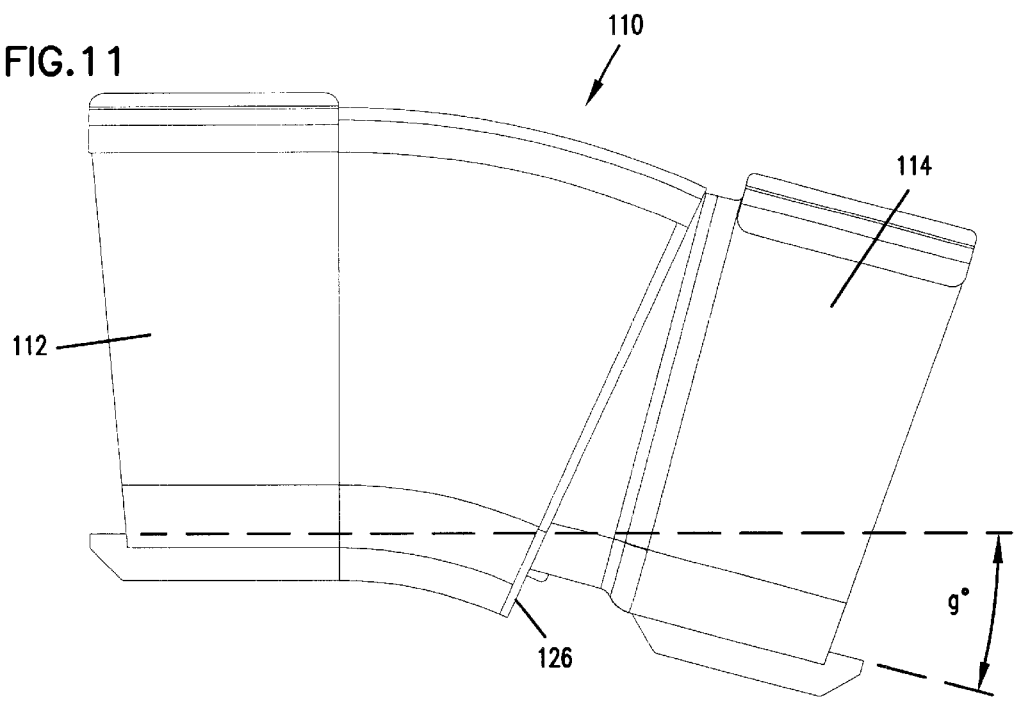
FIG. 11 is a side view of an angle-down cable management trough assembly in a retracted arrangement according to the present invention.
Figure 12:
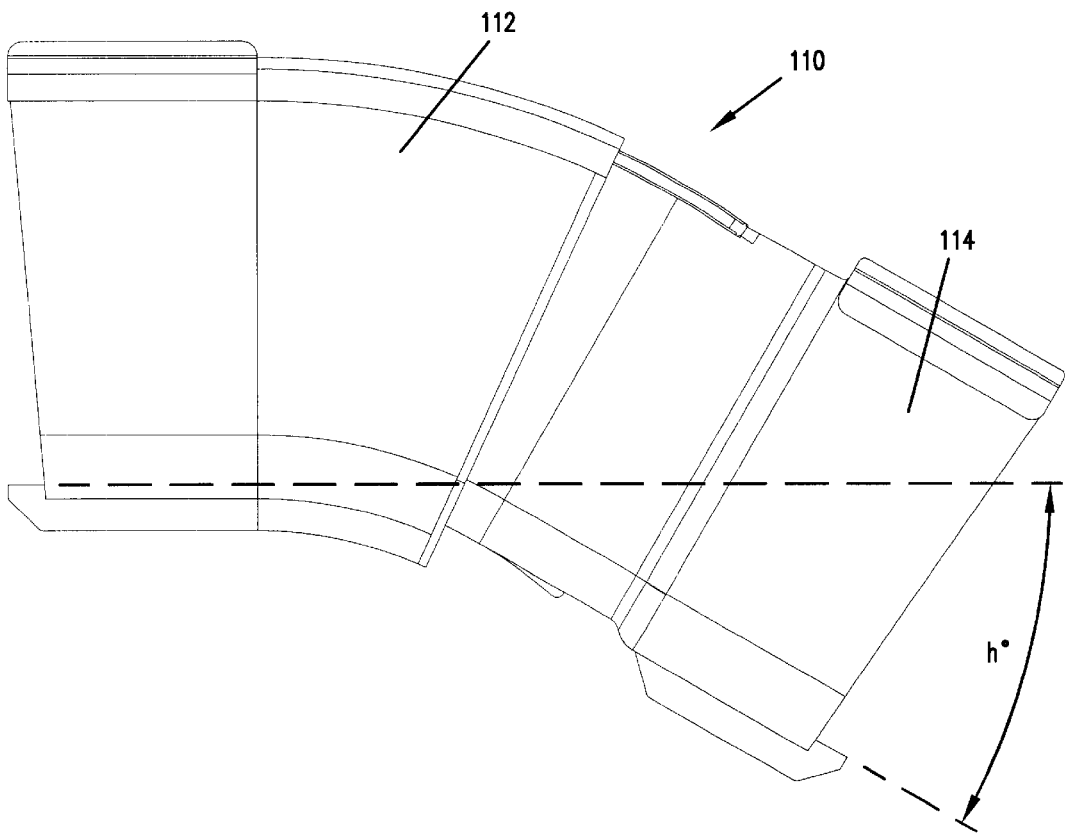
FIG. 12 view of the trough assembly of FIG. 11 in an extended arrangement.

FIGS. 11 and 12 show an angled-down trough assembly 110 according to the present invention. Trough assembly 110 curves and transitions the cable management system downwards. In the illustrated embodiment, trough assembly 110 may be adjusted to angle a cable pathway downwards at any angle between 15 and 30 degrees. Trough assembly 110 includes two trough members 112 and 114.

Trough member 112 shown in FIG. 13 includes a base 116 and sidewalls 118 and 120 forming a U-shaped trough for receiving a plurality of telecommunications cables. The U-shaped trough defines a cable pathway 122 from coupling end 124 to mating end 126 of trough member 112. Base 116 of trough member 112 is curved downward from point 128 to end 126. The curved portion of base 116 angles the cable pathway 122 vertically downward.

Interior sides of sidewalls 118 and 120 define curved, horizontal guide channels 130 and 132. Guide channels 130 and 132 are curved downward at a radius of curvature measured from the same point as a radius of curvature which characterizes curved base 116.

Trough member 114 shown in FIG. 10 also includes a base 134 and two sidewalls 136 and 138 forming a U-shaped trough for receiving a plurality of telecommunications cables. The U-shaped trough defines a cable pathway from mating end 140 to coupling end 142 of trough member 114. Sidewalls 136 and 138 each define a curved, horizontal guide rail 144 and 146. Guide rails 144 and 146 are outwardly extending and curved to be received in guide channels 130 and 132 of trough member 112.

Trough member 114 is tapered at point so that end 140 of trough member 114 may be slidably received in end 126 of trough member 112. Base 134 of trough member 114 is curved from point 150 to end 140. Base 134 does not curve from point 148 to point 150 although curved guide rails 144 and 146 extend on sidewalls 136 and 138 above said non-curved portion of base 134. In the embodiment shown in the Figures, base 134 is angled 15° downward.

End 140 of trough member 114 is received by trough member 112 so that guide rails 144 and 146 are slidably received in guide channels 130 and 132. In this configuration the cable pathways of the two trough members communicate creating a combined cable pathway characterized by a combined angle (shown as angles g° and h° in FIGS. 11 and 12). By pushing trough member 114 further into the trough member 112, the resulting combined angle of the trough assembly 12 is reduced (shown in FIG. 11 as 15°). By pulling trough member 114 away from the trough member 112, assembly 110 is characterized by a larger combined angle h° (shown in FIG. 12 as 30°). In this manner the trough assembly 110 may be telescoped to define a cable pathway characterized by any angle falling within a range of angles. The minimum angle is the angle of trough member 114. The maximum angle may be the sum of the angles of trough members 112 and 114.

Trough member 112 may also include a retention tab 125 having a ramped surface. The retention tab 125 is received in a retention groove 127 defined by base 134 of the second trough member 114 (shown in FIG. 14). The retention tab 112 assists in guiding the two trough members together, prevents trough member 114 from being removed from the trough member 112 after assembly, and limits the combined angle of assembly 110 to 30°.

Trough member 114 also includes ramped guide bars 129. The guide bars assist in guiding trough member 114 into and out of trough member 112 and assist in preventing trough member 114 from binding with trough member 112 when being inserted or pulled away from trough member 112.

The above specification, examples and data provide a description of the invention. Since many embodiments of the invention can be made without departing from the spirit and scope of the invention, the invention resides in the claims hereinafter appended.

What is claimed is:

1. An adjustable cable management trough assembly comprising:
   a first trough member having two upstanding sidewalls extending from a base defining a generally U-shaped trough having an open top and a trough interior for receiving at least one telecommunications cable, the first trough member having first and second ends, the sidewalls being curved so that the first trough member defines a first curved cable pathway defining a first angle;
   a second trough member having two upstanding sidewalls extending from a base defining a generally U-shaped trough having an open top and a trough interior for receiving at least one telecommunications cable, the first trough member having first and second ends, the sidewalls being curved so that the second trough member defines a second curved cable pathway defining a second angle; and
   wherein the second end of the first trough member slidably receives the first end of the second trough member so that the first cable pathway communicates with the second cable pathway, and so that the trough assembly may be selectively set at a third angle, the third angle being selectable from a range of angles.

2. The cable management trough section of claim 1 wherein the range of angles lies between the second angle and the sum of the first and second angles.

3. The cable management trough assembly of claim 1 wherein one of the first trough section and the second trough section includes a guide rail and wherein the other defines a corresponding guide channel for receiving the guide rail.

4. The cable management trough assembly of claim 1 wherein one of the first trough section and the second trough section includes a retention tab having a ramped surface and wherein the other defines a corresponding retention channel for retaining the retention tab and preventing the second trough member from being completely removed from the first trough member.

5. The cable management trough assembly of claim 1 wherein opposite ends of the trough assembly include flanges extending outwardly from the trough member sidewalls and perpendicular to the first and second cable pathways.

6. The cable management trough assembly of claim 1 wherein inner sides of the upstanding sidewalls of the first trough member define first and second upper guide channels terminating at the second end of the first trough member, the upper guide channels being configured to receive horizontal guide rails, and wherein a top side of the base of the first trough member defines a plurality of lower guide channels, and wherein the sidewalls of the second trough member define two upper guide rails received by the upper guide channels of the first trough member, and wherein the base of the second trough member includes a plurality of lower guide rails extending from a bottom side of the base, the lower guide rails being received by the lower guide channels of the first trough member.

7. An adjustable cable management trough assembly comprising:
   a first trough member having two upstanding sidewalls extending from a base defining a generally U-shaped trough having an open top and a trough interior for receiving at least one telecommunications cable, the first trough member having first and second ends, the base being curved so that the first trough member defines a first curved, cable pathway defining a first angle;
   a second trough member having two upstanding sidewalls extending from a base defining a generally U-shaped trough having an open top and a trough interior for receiving at least one telecommunications cable, the first trough member having first and second ends, the base being curved so that the second trough member defines a second curved cable pathway defining a second angle; and
   wherein the second end of the first trough member receives the first end of the second trough member so that the first cable pathway communicates with the second cable pathway, and so that the trough assembly may be selectively set at a third angle, the third angle being selectable from a range of angles.

8. The cable management trough assembly of claim 7 wherein the sidewalls of one of the first and second trough members define opposed hinge posts and the sidewalls of the other define corresponding hinge apertures for receiving the hinge post, where the first trough member may pivot relative to the second trough member around the hinge posts.

9. The cable management trough assembly of claim 7 wherein one of the first trough section and the second trough section includes a retention tab having a ramped surface and wherein the other defines a corresponding retention channel for retaining the retention tab and preventing the second trough member from being completely removed from the first trough member.

10. The cable management trough assembly of claim 7 wherein the first and second trough members define opposite ends having the same coupling profile for coupling to a coupling member on opposite ends of the trough assembly.

11. The cable management trough assembly of claim 7 wherein one of the first trough section and the second trough section includes a curved guide rail and wherein the other defines a corresponding curved guide channel for receiving the guide rail.

12. The cable management trough assembly of claim 11 wherein the curved guide rail extends horizontally and outwardly from a sidewall.

13. The cable management trough assembly of claim 7 wherein opposite ends of the trough assembly include outwardly extending flanges.

14. A telescoping cable trough assembly comprising:
   a first angled, U-shaped trough member including a coupling end and an opposite mating end;
   a second angled, U-shaped trough member including a coupling end and an opposite mating end;

the mating end of the second trough member mated with the mating end of the first trough member for relative movement, wherein a portion of the mating end of the second trough member slides relative to a portion of the mating end of the first trough member, and wherein the relative movement of the second trough member and the first trough member alters a combined angle of the cable trough assembly;

wherein the coupling ends of the first and second trough members define the same coupling profile for connecting to a coupling member on either coupling end.

15. The telescoping trough assembly of claim 14 further wherein the coupling ends of the trough members include outwardly extending flanges.

16. The telescoping trough assembly of claim 14 wherein one of the first and second trough members include a pivot post and the other defines a pivot aperture for receiving the pivot post so that the trough members pivots relative to each other.

17. The telescoping trough assembly of claim 14 wherein the first and second trough members include angled sidewalls.

18. The telescoping trough assembly of claim 14 wherein the first and second trough members include an angled base.

19. A method of assembling a cable management system comprising the steps of:

providing a first and second spaced-apart U-shaped end members;

providing an extendable, curved U-shaped trough assembly having first and second trough members positioned between the first and second end members;

extending the trough assembly;

connecting the first and second trough members to the respective first and second end members, wherein the first and second trough members remain freely slidable upon disconnecting at least one of the first and second trough members from the respective first and second end members.

20. The adjustable cable management trough assembly of claim 1 wherein the first trough member slideably receives the second trough member so that by sliding movement the trough assembly may be selectively extended or retracted in length.

21. The adjustable cable management trough assembly of claim 1 wherein the first end of the first trough member and the second end of the second trough member define the same coupling profile.

* * * * *

UNITED STATES PATENT AND TRADEMARK OFFICE
CERTIFICATE OF CORRECTION

PATENT NO. : 6,585,195 B2
DATED : July 1, 2003
INVENTOR(S) : Wentworth et al.

It is certified that error appears in the above-identified patent and that said Letters Patent is hereby corrected as shown below:

Column 2,
Line 25, "FIG. 1 top view" should read -- FIG. 1 is a top view --
Line 29, "trough sen" should read -- trough sections in an --
Line 31, "FIG. 3 a top view" should read -- FIG. 3 is a top view --
Line 44, "FIG. 8 side view" should read -- FIG. 8 is a side view --
Line 49, "FIG. 10 is perspective view" should read -- FIG. 10 is a perspective view --
Line 54, "FIG. 12 view" should read -- FIG. 12 is a side view --
Line 59, "FIG. 14 is perspective view" should read -- FIG. 14 is a perspective view --

Column 4,
Line 59, "as 300)." should read -- as 30º). --

Column 5,
Line 42, "from end 81 20 to" should read -- from end 81 to --

Column 7,
Line 35, "first trough member" should read -- second trough member --

Column 8,
Line 25, "first trough member" should read -- second trough member --

Column 9,
Line 18, "members pivots" should read -- members pivot --

Signed and Sealed this

Ninth Day of December, 2003

JAMES E. ROGAN
*Director of the United States Patent and Trademark Office*